Patented Apr. 28, 1936

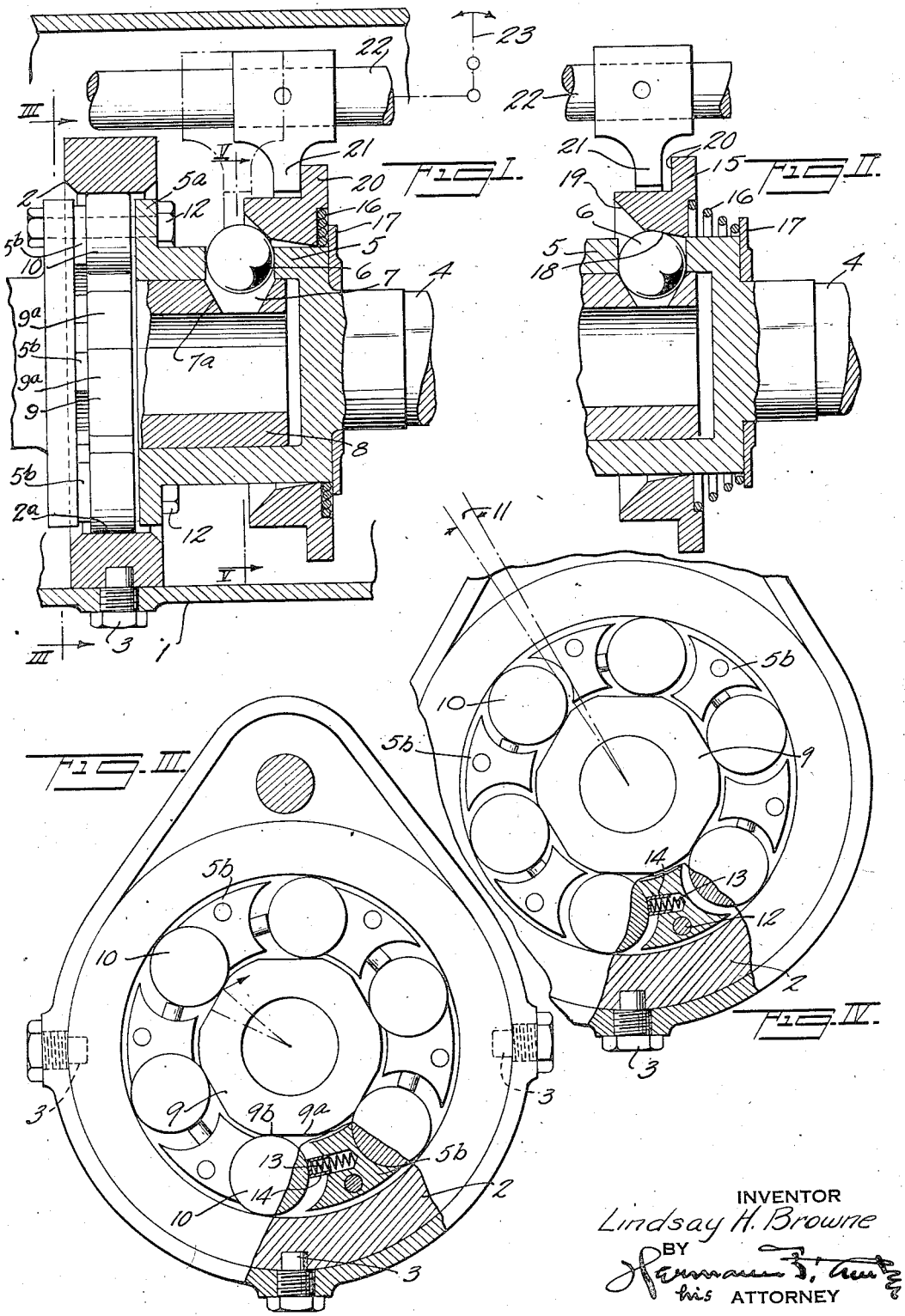

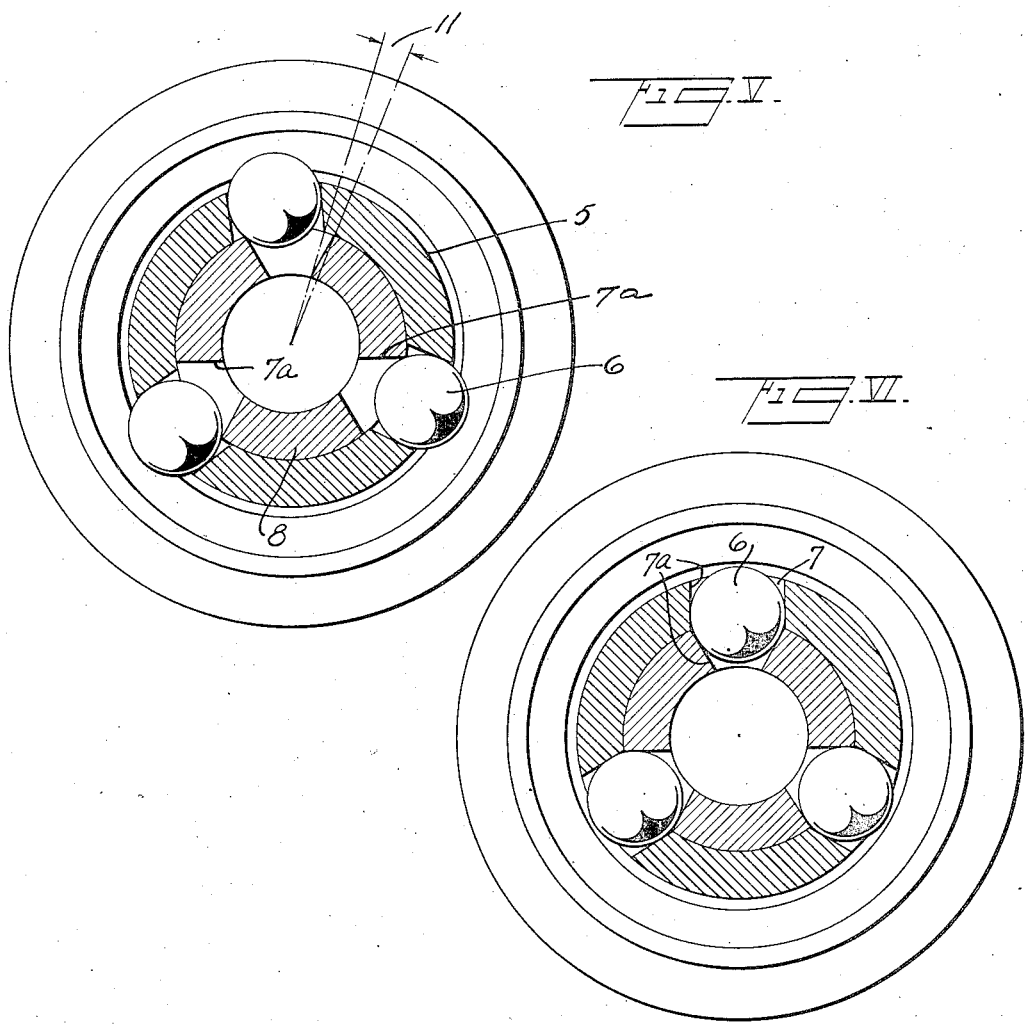
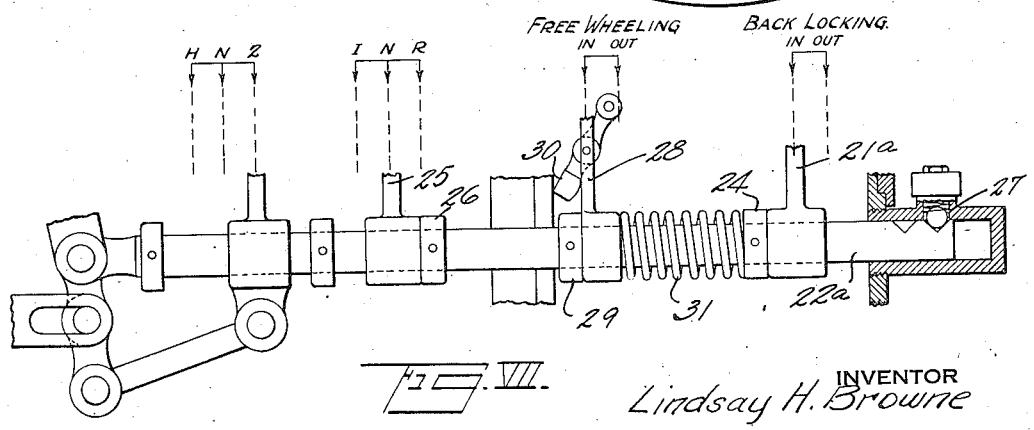

2,038,984

UNITED STATES PATENT OFFICE 2,038,984

AUTOMOBILE BACK-ROLLING DEVICE

Lindsay Hugh Browne, Rochester, N. Y., assignor to Josiah Anstice & Co., Inc., Rochester, N. Y., a corporation of New York Application December 21, 1932, Serial No. 648,186

4 Claims. (Cl. 192—4)

This invention relates to the control of the movement of an automobile, and in particular the interconnections between the driving and driven shaft and certain features primarily involving the control of the movement of a car due to its mass tending to roll the car backwards when on an incline. Among the particular objects are to prevent the back-rolling of the car, and in the form involved in such invention such back-rolling is prevented by automatic means to lock the driven shaft against rotation when the mass of the car would otherwise tend to start back-rolling with the turning of the wheels, and therefore the turning of the driven shaft.

This application is a continuation in part of my co-pending application Serial No. 569,159 filed October 16, 1931.

Such purpose is accomplished by means embodied in a structure which by voluntary action of the driver permits the rearward movement of the car when desired, and which in turn permits voluntary action to set the mechanism that at the proper time and under the proper conditions will cause automatic functioning of the back-rolling locking or clutch mechanism, and also means whereby voluntary further action will insure the functioning of the back-rolling lock mechanism, and other advantageous features which will appear from a more detailed description hereinafter set forth. These objects are attained by means of manipulation by the driver of the car which are coordinated with the control of the transmission of power, and may be interlocking or otherwise, as hereinafter set forth. For example, the entire control of the mechanism to produce the varied functions automatic or voluntary, may be interconnected so that a single lever effecting the control of transmission for reverse drive or engine disconnection, that is neutral, or the several forward speed drives, likewise controls the functioning of the back-rolling mechanism or sets the back-rolling lock in position for automatic actuation under the proper conditions,—so that control of the back-locking mechanism becomes an inherent part of the control of the car without any additional means for manipulation, but with assurance of its functioning, either in or out of action, in a manner that meets all of the essential practical requirements in practical use.

While this is essentially applicable to the present day motor car with selective gear set, it will be seen that its application is not necessarily limited thereto, but might apply in the case of power driven vehicles of all sorts and other power driven mechanism. Various features of construction may likewise be applicable to other power control mechanism, and in general the invention herein contained is not limited beyond the scope of the claims as hereinafter set forth.

The specific form herein shown and described includes a back-rolling lock mechanism and its direct control or interlocking control with typical three-speed forward and reverse transmission mechanism actuating means. It provides a back-rolling lock mechanism which is thrown out of functioning action when the power transmission is set for reverse drive, thereby permitting rearward movement of the car. It permits the shifting of the transmission control lever to neutral, and also to any one of the forward speed positions without throwing the back-rolling lock mechanism into functioning position solely by the movement of the lever, but merely setting the same so that the back-rolling lock is automatically thrown into functioning by either forward rolling of the car or the actual forward drive or the connection of the clutch, so that the transmission mechanism starts to move the transmitting shaft connections in a forward direction for forward movement of the car. Also, when the car is being driven forward at any speed it permits the shifting of the speed control lever to neutral without negativing the functioning of the back-rolling lock mechanism. In particular, it provides a mechanism which when suitably designed as to dimensions and details, for any particular car as to weight and power, it assures the retention of the back-rolling lock out of functioning against any accidental change, until there is a slight forward movement of the car or a slight forward driving effort transmitted from the engine. It also provides for voluntarily releasing the back-rolling lock mechanism to prevent its functioning, and assures such voluntary action when desired even though the car may be locked against back-rolling due to previous actuation of the control mechanism.

It will be noted that meeting the conditions evident by the construction shown and described herein, a car may be freely rolling rearward and the gear shift lever may be thrown in any forward drive position to anticipate resuming forward drive, without causing a locking or setting into position to lock of the back-rolling mechanism, which otherwise would cause excessive strains and jamming of parts if such functioning occurred when the car was actually rolling backward and before the brakes had brought the car to a stop. Should a car be driven into a position tight against a post or the like, when forward speed drive has been actuating, the back-rolling lock will be in functioning position and prevent back movement, which in other devices would thereby completely stall the car preventing either forward or rearward drive movement,—but in the mechanism herein described the driver may at all times, in such circumstances, voluntarily release the back-rolling lock mechanism. Likewise if the car is held on a steep incline by the back-lock mechanism and it is desired to permit back-rolling, voluntary action by the driver can instantly release the back-rolling mechanism. These and other features of control essential for practical operation are provided for in the practice of this invention. While the single gear shift lever by the interlocking means assures the control of the vehicle for all these purposes essentially automatic with the normal shifting of gear drive, in certain cases additional means may be provided for emergency actuation, such as by one additional lever to positively throw out the back-lock mechanism in the case of heavy-duty trucks or the like, or for further assurance in cases of unusual or extreme conditions.

In the accompanying drawings there is shown:

Fig. I is a vertical section of the back-lock mechanism and its immediate controlling parts,—in non-functioning position.

Fig. II is a similar view, fragmentary, of the parts causing the back-rolling lock mechanism to take a functioning position.

Fig. III is a section on line III—III of Fig. I, shown in elevation or end view the back-rolling locking rollers in their out-of-functioning position.

Fig. IV is a view similar to Fig. III, with the back-rolling locking rollers in their locking or functioning position.

Fig. V is a section on the line V—V of Fig. I,— showing the setting mechanism in out-of-functioning position.

Fig. VI is a view similar to Fig. V showing the setting mechanism to prevent back-rolling in its functioning position.

Fig. VII is a side elevation of a shifter-bar and its connections, part diagrammatic, adapted to effect the interlocking control by the driver.

A housing 1, shown fragmentary, is a suitable housing connected to a fixed part of the vehicle such as the rear end of a gear shift transmission casing. In the housing a stationary ring 2 is held, as by dowels 3, rigidly against rotation in the housing. A driven shaft 4 is the connecting shaft for transmission of power directly or indirectly to the rear wheels, and is turned by any movement of the rear wheels when the vehicle moves forward, or when it moves backward in case the back-locking mechanism is not functioning. Connected with this shaft 4 is a cam-carrier 5, which in the form shown has three holes, in each of which a ball 6 fits closely but with perfect freedom for radial movement in the holes. Radially inward from these holes are recesses or tapered counterbores 7 in a cam-sleeve 8, which is a stub-shaft or sleeve integrally formed with or rigidly attached to a locking head 9 located in the plane of the stationary ring 2, and having rollers 10 between the faces 9ª on the locking head 9 and the inner surface 2ª of the stationary ring.

In the form shown, the hexagonal faced locking or cam-head 9 has been designed for the mechanism to suit a car of particular characteristics as to weight, etc., and in conjunction with the three counterbored holes 7 having their walls 7ª approximately thirty degrees to their axis, but the polygonal locking head may have a different number of faces, or differently shaped faces, and the number of locking balls and the counterbore cam holes may vary,—to suit the particular conditions for which the mechanism is designed. It must be noted, however, that the three locking balls for the setting mechanism afford uniform engagement for the floating ring 15 under the pressure of spring 16.

The polygonal faced locking head 9 and its stub-shaft or sleeve 8 have a bearing in the cam-carrier 5, holding it snug but permitting free rotary movement at least to a slight extent,—so that the balls 6 when outwardly retracted allow a relative slight rotation, which in the particular design approximates four or five degrees, as indicated at 11.

The cam-carrier 5 has a flange 5ª, and integrally formed with it are the abutments or segments 5ᵇ through which, in this form of construction, the bolts 12 extend through the abutment 5ᵇ connecting the member 5 rigidly with any suitable driving flange as shown on the left of Fig. I on the driving shaft transmitting power from the engine. The back-rolling lock mechanism may be directly connected as an intermediary anywhere between the driven wheels and the source of driving torque.

More particularly shown in Figs. III and IV, the rollers 10 are pressed by springs 13, which rest in sockets or recesses in the abutments 5ᵇ, and as shown have a cap 14 which presses against the roller 10. When there is no resistance to relative turning of the polygonal head 9, the springs 13 force the rollers 10 against the opposite abutments, where they rest having contact at 9ᵇ with the cam face 9ª and having an outer contact with the inner surface 2ª of the fixed ring 2. In that position they resist any relative turning, in an anti-clockwise direction of the polygonal head 9 with respect to the abutments 5ᵇ and cam carrier 5, as shown in Fig. III,—and such resistance is measurably in preponderance over any tendency to relatively turn the stub-shaft 8 of the polygonal head against any action then being effective on the balls 6 due to reaction of the steep bearing face 19 and the engagement of the balls on the outer edge of the walls 7ª, that is the edge of the countersunk holes 7. Consequently, in the position shown in Fig. III the polygonal head 9 is positively held out of any position permitting any locking action between it through the rollers 10 with the fixed or stationary ring 2, because the rollers 10 will slip on the fixed ring and keep their engagement with the abutments 5ᵇ due to the springs 13, thereby preventing any relative movement of the polygonal cam face head 9. With six rollers there will always be three on the side where their weight will cause them to maintain such stated position in addition to any effort or reaction of the springs 13, and consequently there will always be a reaction between the cam-head and the rollers and the cylindrical ring that prevents any relative movement of the cam-head and its sleeve or stub-shaft 8. This reaction holds balls 6 in their radially outward position against pressure of the floating ring face 19 caused by spring 16 of suitable predetermined strength. Only the steep bearing face 19 is then in contact because the balls 6 are then riding on the rim of the wall 7ª of the counter-sunk hole in the sleeve 8, and held there by the opposite wall of the cylindrical hole in carrier member 5, as shown in Fig. V, and the floating ring 15 cannot ride over the balls but simply position itself uniformly on the three balls.

However, when the rollers 10 are slightly released by the counter-clockwise relative movement of the abutments 5ᵇ with respect to the locking cam-head 9 and its stub-shaft 8, then such slight relative movement moves the countersunk holes 7 toward a position of registration with the holes in the sleeve 5, thereby relieving the resistance to spring 6 by freeing the balls from their previously locked position on the edge of the wall 7ᵃ, and thereby allowing the balls 6 to freely enter the recesses 7, and then the relative pressure due to face 19 is sufficient to cause the balls 6 to be instantly driven radially inward to firmly engage the recesses 7, thereby positively moving the polygonal head 9 into position for back roll locking. With this movement of the floating ring its second bearing face 18, having a very acute angle, engages the balls and positively holds them in the position that locks the polygonal head relative to the abutments 5ᵃ, whereby the rollers 10 will be restrained to their jamming or locking position before they can move far enough to contact with the abutments 5ᵇ. In the latter position the back rolling lock effect is positively assured for instant functioning.

The radially inward movement of the balls 6 is prevented, as shown in Fig. V, by their engagement with the edges of the holes in the stub-shaft 8 when they are out of register with the holes in the sleeve 5, but when these holes and the countersunk recesses approach registration, the over-riding floating ring 15, due to the predetermined force of the spring 16, reacting against the flange 17 instantly forces the balls radially inward. Such degree of inward pressure of the riding face 18 caused by the spring 16, depends upon the reaction due to the angle of the face 18, which in the form shown approximates four degrees which has been found to effectively force the balls and lock the balls 6 to securely hold the cam-carrier 5 and the polygonal head stub-shaft 8 positively in the required interlocked position. The floating ring 15 has the initial riding face 19 which serves as a preliminary engagement between the floating ring 15, when the spring 16 sets it in motion,—after it has been released from its set position out of action. This setting out of action is effected by a fork 21 engaging the flange 20 on the floating ring 15, being actuated by the shifter-bar 22. Shifter-bar 22 may be moved by lever 23 diagrammatically illustrated in Fig. I, or by fork 21ᵃ as part of a single shifter-bar, shown in Fig. VII, which is coordinated with the intercontrol of all of the transmission gear set members.

In the specific form herewith shown, the spiral spring 16 reacts against its abutment to exert a pressure of from four to six pounds against floating ring 15, and the initial bearing or riding surface 19 has an angle of approximately forty-five degrees. Balls 6 would be subject to centrifugal force tending to throw them radially outward during rotation of the shaft, and the bevel face 19 extending completely around the floating ring 15, having an angle as stated, centres the floating ring on the three balls, but the reaction is not sufficient to press them radially inward until the resistance is released, which holds the stub-shaft 8 due to the rollers 10 pressing against the hexagonal faces 9ᵃ. When, however, the rotation of the drive shaft due to forward movement of the vehicle, or the relative slight rotation due to letting in the clutch for starting forward drive causes the abutments 5ᵇ to positively move rollers 10 anti-clockwise relative to the cam faces 9ᵃ, it brings holes 7 toward a register with the balls, and then the pressure due to spring 16 is sufficient to instantly shift and positively force the floating ring over the balls by a reaction of the bearing surface 18 due to its slight angle, and hold the balls in against any reaction of the thirty-degree angle on the walls 7ᵃ of the holes 7.

While the interrelation of these parts is such that it will cause positive locking to the extent necessary to maintain the proper displacement of the locking faces 9ᵃ with respect to the abutments 5ᵇ, nevertheless, the interengagement of the floating ring and the balls is such that voluntary effort on the part of the driver by means of the gear shift lever can always and instantly release the floating ring, allowing freedom for radially outward movement of the balls and thereby permits a slight relative turning, in this case about five degrees, due to the pressure of rollers 10 in the direction of locking of the locking head 9, which is sufficient to permit the rollers 10 to move against the abutments 5ᵇ, and in such position the back-rolling lock ceases to function because the rollers will slide on the inner face of the fixed ring 2 and the cam faces 9ᵃ have moved sufficiently relative to abutments 5ᵇ so that they are out of the jamming or locking position. It will be noted that the release of the balls is positive by simple, complete freeing them of a preponderant balancing force, and then the release of the car locking rollers is instant and due to the cam face backing away freely under the car-locking pressure which has instantly become the preponderant force.

In the operation it will be noted from Fig. VII that fork 21ᵃ has its hub or boss mounted loose on shifter-bar 22ᵃ, which in turn has a collar 24 fixed to the shifter-bar. Thus the shifter-bar moved to the right, in the view shown, forces the hub of the fork 21ᵃ positively to the right, which in turn moves the floating ring 15 against the resistance of spring 16 and releases the balls 6,— thereby putting the back-rolling lock mechanism out of functioning. When, however, the shifter-bar 22ᵃ is then moved to the left it does not positively move the hub of the fork 21ᵃ, but simply releases pressure on it, thereby permitting the movement of the fork 21ᵃ but not positively moving it, which thus leaves the mechanism in position for automatic action, and the floating ring 15 does not move under the pressure of spring 16 until the interrelation of parts in the mechanism permits. It thus sets the back-rolling mechanism in position that it may function, and the functioning takes place only, but takes place instantly and positively when the car has started slight forward rolling, or the engine has delivered a slight forward torque impulse effecting a relative forward turning of the driving shaft. It will be noted that the functioning results from positive setting when releasing of balanced forces with preponderant margins to assure positive and instant action when the balance of force is reversed,—and is not dependent upon friction discs, wedges or like engagement of surfaces subject to sticking or freezing and wear, and which cannot function when locked under pressures involved in devices of this character and therefore can never be positive nor instantaneous in their functioning.

The interlocking of the other operations of transmission control will be noted from Fig. VII, and as described in detail in my copending application above cited. In brief, the effect is that the shifter-bar with its fixed collar 24, is pulled away from the hub of the back-lock mechanism fork, after the back-lock has been positively set out of functioning, and this pulling away is effected when the gear shift lever is in neutral, or in any one of the forward speed positions. When, however, the gear shift fork 25 is moved to reverse position it presses against collar 26 and moves the shifter-bar, and thereby the collar 24 putting the back-lock mechanism out of functioning. A spring-pressed ball 27 engaging two notches on the shifter-bar 22ª assures any jarring loose or accidental movement by a slight resistance, thus maintaining the shifter-bar in a definite "out" or "in" position with respect to the back-lock setting mechanism. The free-wheeling control fork 28 may in turn be positively moved by the collar 29 interlocking with the gear shifting, or positively moved by the separate voluntarily operated lever 30, while its reverse direction which permits free-wheeling, is effected by spring 31.

In my preferred form the mechanism is embodied with any gear shift mechanism for example such as described, but it may also be applied to an existing structure of a gear shift case having shifter-bars of the now usual form. In such case the adaptation of my back-rolling device secured to a gear case is actuated by positioning the back-lock shifter-bar 22, so that the movement of the regular gear shift-bar which actuates the reverse gear also pushes shifter-bar 22 in order to set the back-rolling lock mechanism out of functioning, and in turn when shifting from reverse to neutral it releases the shifter-bar and fork of the back-rolling lock mechanism, so that it may automatically proceed to function under the conditions above described.

The operation of this device briefly described with reference to the specific form herein shown is as follows: when a car is moving forward and gear shift is not in reverse, the device assumes the condition shown in Figs. II, IV and VI, in which rollers 10 are ready to lock cam-head 9 to the fixed anchor-ring 2 and prevent back rolling, but locking does not occur so long as the car moves forward with the shaft turning cam-head 9 to keep the rollers free. The position of cam faces 9ª relative to abutment 5ᵇ is such that rollers 10 reach a locking position and cannot move into engagement with abutments 5ᵇ. So when the car stops, say on an incline, the mere starting to roll back is instantly prevented by the rollers locking the shaft to the fixed anchor-ring 2.

However, if the operator desires to allow back rolling, or wishes to back up, the reverse shift is thrown in, shifts the floating ring 15 against pressure of spring 16, thus instantly releasing the pressure on balls 6. The balls move radially outward, the stub-shaft is under rotative strain due to roller pressure on the the cam-head and being so freed the cam-head 9 turns fractionally, say four or six degrees, but just enough to allow rollers 10 to move under pressure of spring 13, so as to contact each with its adjacent abutment 5ᵇ, and each cam face is shifted so far that the rollers are free and cannot lock the anchor ring to the cam-head. This condition is shown in Figs. I, III and V. The cam-head is held in this "out" position by the rollers, and the balls 6 are held in their radially outward position by the cooperation of the parts, the mountings, relative dimensions, and the angle of the surfaces transmitting the cooperating forces. When however a car starts forward motion the stub-shaft begins to turn relative to the abutment 5ᵇ, balls 6 are instantly free to move inward and the angle of face 19 on floating ring is such that the pressure of spring 16 forces the balls into locking position, thus positively shifting stub-shaft around the full fractional amount required to set the cam-head into its locking position. This occurs when the reverse gear shift is not set. It will be noted the functioning or operations involve a balancing of forces, and with roller and ball contacts, it does not depend upon the friction of interengaging parts,—and resultant advantages are evident from the more detailed description of the mechanism.

It will be seen that when reverse has been set and the car is rolling backward the lock is positively out of functioning and is there held until the car actually rolls forward.

The particular form herein shown and described as to the relative dimensions and relation of parts represents a design for a car of about two tons weight, and provides for perfect functioning to meet all the practical conditions of operation.

In the design to meet the conditions of much heavier or lighter cars, or in conjunction with any type of transmission variations may be made for simplicity or economy of construction, or for other reasons. Rearrangement of parts may be made, and the construction may be initially embodied as a unit design for a transmission, or may be an added part with various changes to suit particular cases, all without departing from my invention, but what I claim and desire to secure by Letters Patent is:

1. A back-rolling-lock mechanism of the character described, having a cylindrical locking face and a concentric member with a plurality of cam faces, intermediate locking rollers, abutments adjacent each roller and means of support permitting a slight rotary movement of the abutments relative to the cam member, means to lock the cam member relative to the abutments including three radially movable balls adapted at their inward position to lock the cam member and abutments and when displaced radially outward to permit differential slight relative rotary movement of said parts, and a floating ring to actuate said balls having a three-point engagement for uniform pressure on each ball and a spring to press said floating ring into such uniform engagement with all three balls.

2. A back-rolling-lock mechansm of the character described, having a cylindrical locking face and a concentric member with a plurality of cam faces, intermediate locking rollers, abutments adjacent each roller and means of support permitting a slight relative rotary movement between the cam member and abutments, three balls for locking or unlocking the relative position of said cam member and said abutments, a floating ring overriding said balls and a single spring to force the overriding, so constructed and arranged that uniform pressure is exerted on all three balls.

3. A back-rolling-lock mechanism as in claim 2 having associated with the cam member and abutment support, a radial guide-hole in one of them for said balls and a counter-bore in the other of them with walls for ball engagement approximately thirty degrees inclined to the axis of the counter-bore.

4. A back-rolling-lock mechanism as in claim 2 having guide-holes for each of said balls and a counter-bore for each ball with its flaring or entering end of substantially the same size and adapted to register witht he said guide-hole.

LINDSAY HUGH BROWNE.